US011502566B2

(12) United States Patent
Tomioka

(10) Patent No.: US 11,502,566 B2
(45) Date of Patent: Nov. 15, 2022

(54) STATOR WINDING, GENERATOR, AND CONNECTION METHOD OF STATOR WINDING CONDUCTOR

(71) Applicants: KABUSHIKI KAISHA TOSHIBA, Minato-ku (JP); TOSHIBA ENERGY SYSTEMS & SOLUTIONS CORPORATION, Kawasaki (JP)

(72) Inventor: Taizo Tomioka, Yokohama (JP)

(73) Assignees: KABUSHIKI KAISHA TOSHIBA, Minato-ku (JP); TOSHIBA ENERGY SYSTEMS & SOLUTIONS CORPORATION, Kawasaki (JP)

(*) Notice: Subject to any disclaimer, the term of this patent is extended or adjusted under 35 U.S.C. 154(b) by 301 days.

(21) Appl. No.: 16/809,811

(22) Filed: Mar. 5, 2020

(65) Prior Publication Data

US 2020/0295613 A1    Sep. 17, 2020

(30) Foreign Application Priority Data

Mar. 11, 2019    (JP) .............................. JP2019-044030

(51) Int. Cl.
*H02K 3/24*    (2006.01)
*H02K 1/16*    (2006.01)
(Continued)

(52) U.S. Cl.
CPC ................. *H02K 3/24* (2013.01); *H02K 1/16* (2013.01); *H02K 3/14* (2013.01); *H02K 3/28* (2013.01);
(Continued)

(58) Field of Classification Search
CPC ........ H02K 15/0093; H02K 1/16; H02K 3/28; H02K 3/22; H02K 3/24; H02K 3/14;
(Continued)

(56) References Cited

U.S. PATENT DOCUMENTS 7,199,338 B2    4/2007    Breznak et al.
7,219,827 B2 *  5/2007    Breznak .................... H02K 3/22
                                                                228/245
(Continued)

FOREIGN PATENT DOCUMENTS

JP    8-205443 A    8/1996
JP    2006-149187 A    6/2006
(Continued)

*Primary Examiner* — Leda T Pham
(74) *Attorney, Agent, or Firm* — Oblon, McClelland, Maier & Neustadt, L.L.P.

(57) ABSTRACT

A stator winding includes: a plurality of stator bars and a connection structure. Each of the stator bars penetrates each of the stator slots and includes at least one hollow element wire, wherein inside the at least one hollow element wire a flow hole for a cooling medium is formed. A connection structure includes: a sleeve whose axial one end is fitted to a vicinity of an end of the stator bar; a closing plate disposed at another end of the sleeve; and a hollow extension pipe. The hollow extension pipe is disposed in a space defined by the sleeve and the closing plate at the end of the stator bar, and makes the flow hole of the hollow element wire and an outside of the space communicate each other. A brazing material is filled in the space.

8 Claims, 22 Drawing Sheets

(51) Int. Cl.
*H02K 15/00* (2006.01)
*H02K 3/28* (2006.01)
*H02K 9/197* (2006.01)
*H02K 3/14* (2006.01)

(52) U.S. Cl.
CPC ......... *H02K 9/197* (2013.01); *H02K 15/0093* (2013.01)

(58) Field of Classification Search
CPC .......... H02K 9/197; H02K 3/505; H02K 1/20; H02K 3/38; H01R 9/11; H01R 4/22; B23K 1/0008; B23K 2101/36
See application file for complete search history.

(56) References Cited

U.S. PATENT DOCUMENTS

| | | | |
|---|---|---|---|
| 7,405,379 B2 | 7/2008 | Breznak et al. | |
| 7,417,341 B2 * | 8/2008 | Mall | H02K 15/0093 310/59 |
| 7,741,587 B2 | 6/2010 | Breznak et al. | |
| 2006/0107519 A1 | 5/2006 | Wang et al. | |

FOREIGN PATENT DOCUMENTS

| | | | |
|---|---|---|---|
| JP | 2006-340521 A | 12/2006 |
| JP | 4953620 B2 | 6/2012 |

\* cited by examiner

周方向

Joining position with cooling pipe

Conductor set cut-away position

Joining position with cooling pipe

STATOR WINDING, GENERATOR, AND CONNECTION METHOD OF STATOR WINDING CONDUCTOR

CROSS-REFERENCE TO RELATED APPLICATIONS

This application is based upon and claims the benefit of priority from Japanese Patent Application No. 2019-044030 filed on Mar. 11, 2019, the entire content of which is incorporated herein by reference.

FIELD

The embodiments of this invention relate to a stator winding, a generator, and a connection method of stator winding conductors.

BACKGROUND

A water-cooling type turbine generator often adopts a system in which a cooling water flow channel is formed in stator winding conductors, i.e., a stator direct water-cooling system.

Each conductor of the stator windings typically penetrates each of a plurality of stator slots which are formed radially inside a stator so as to be arranged spaced peripherally from one another and to axially extend. Each conductor penetrating each slot of a stator core is called a stator bar which is a set of a plurality of coil element wires arranged in a matrix. Some of the plurality of coil element wires are configured to be hollow so as to allow cooling water to pass therethrough.

Each stator bar is joined with an end fitting at axially outside of the stator core.

Brazing is typically used to join each stator bar and the end fitting (clip), and reliability of the brazing becomes an issue at the joining part between the each stator bar and end fitting. For example, at the joining part with the end fitting, degradation of the joining part due to crevice corrosion, or corrosion of the brazing part in the case of the presence of many voids in the brazing part, may progress faster than anticipated.

Therefore, it is important to ensure reliability of the joining part. In this regard, there is desired a joining method capable of being carried out without introducing a process requiring any special operation such as erecting a long stator bar in the vertical direction. Further, in a case where repair associated with aging of the joining part including the end fitting is considered, there is desired a repair method capable of being carried out even in an installation state of the stator and capable of ensuring reliability at the joining part. Refer to Japanese Patent Application Laid-Open Publication No. 2006-340521, for example, the entire content of which is incorporated herein by reference.

BRIEF DESCRIPTION OF THE DRAWINGS

FIG. 14 is a sectional longitudinal view for explaining a fixing stage of the closing plate and the like.

FIG. 21A illustrates a state before repair and FIG. 21B illustrates a state after repair.

DETAILED DESCRIPTION

Figure 1:
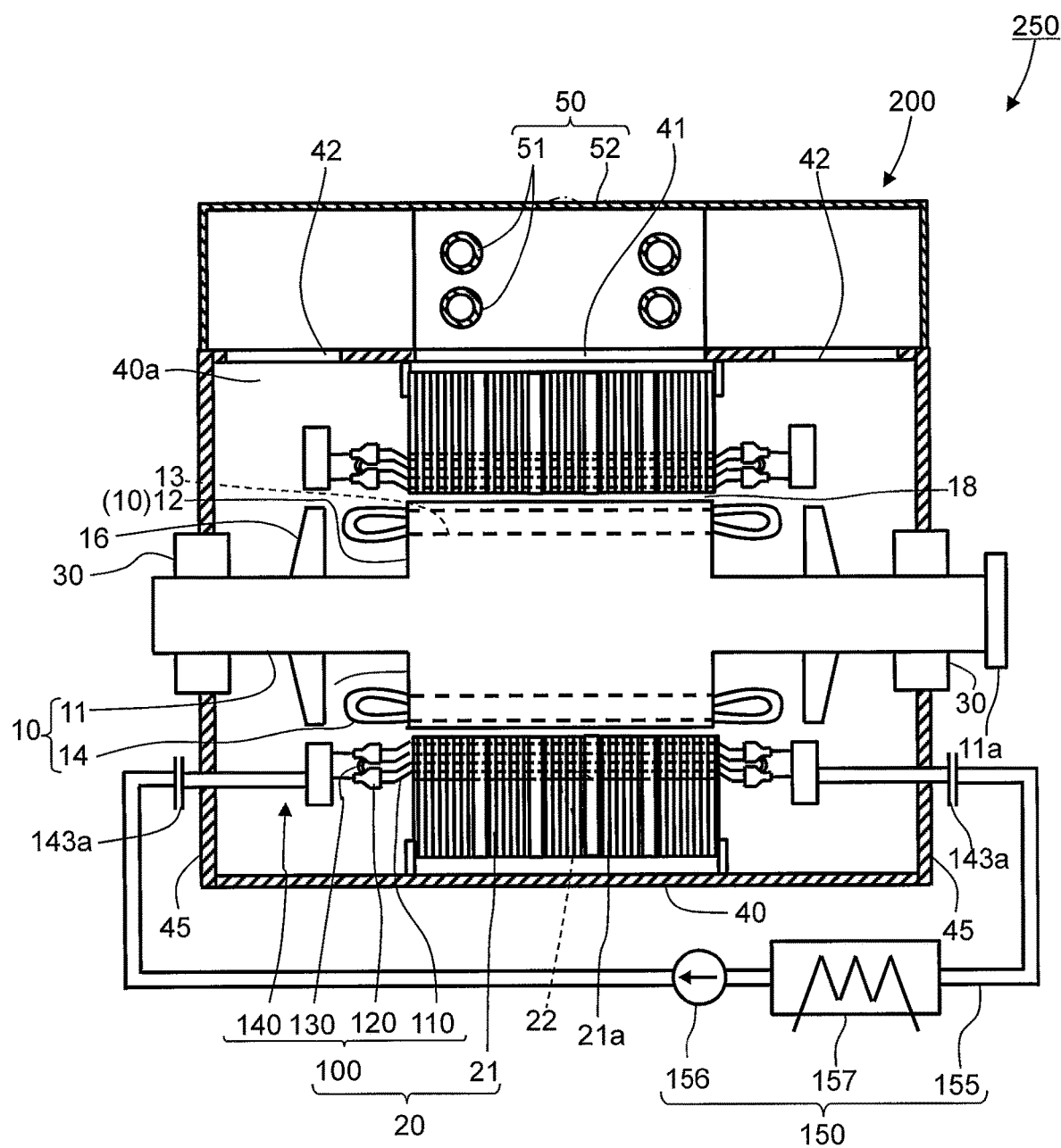
FIG. 1 is a sectional longitudinal view illustrating the configuration of a generator system including a generator according to a first embodiment.

In view of the above situation, an object of the embodiments of the present invention is to ensure reliability at the joining part between the stator bar of the stator windings and the end fitting.

According to an aspect of the present invention, there is provided a stator winding axially penetrating a plurality of stator slots which are formed radially inside a stator core so as to be spaced peripherally from one another and to axially extend, comprising: a plurality of stator bars each penetrating one of the plurality of stator slots and having at least one hollow element wire inside of which a flow hole for a cooling medium is formed; a connection structure having a sleeve whose axial one end is fitted to the vicinity of an end of the stator bar, a closing plate disposed at the other end of the sleeve, and a hollow extension pipe disposed in a space defined by the sleeve and the closing plate at the end of the stator bar, and making the flow hole of the hollow element wire and an outside of the space communicate each other; and a brazing material filled in the space.

According to an aspect of the present invention, there is provided a generator comprising: a rotor extending in a direction of rotation axis and having formed therein a rotor core at an axial center thereof; and a stator having a hollow cylindrical stator core disposed radially outside the rotor core and a stator winding axially penetrating a plurality of stator slots which are formed radially inside the stator core so as to be spaced peripherally from one another and to axially extend, wherein the stator winding includes: a plurality of stator bars each penetrating one of the plurality of stator slots and having at least one hollow element wire inside of which a flow hole for a cooling medium is formed; a connection structure having a sleeve whose axial end is fitted to the vicinity of an end of the stator bar, a closing plate disposed at the other end of the sleeve, and a hollow extension pipe disposed in a space defined, at the end of the stator bar, by the sleeve and the closing plate and making the flow hole of the hollow element wire and an outside of the space communicate each other; and a brazing material filled in the space.

According to an aspect of the present invention, there is provided a connection method for a stator winding conductor, comprising: a stator bar preparation step of preparing a stator bar having at least one hollow element wire inside of which a flow hole for a cooling medium is formed; a mounting step of mounting a sleeve to an end of the stator bar; a space defining step of mounting a closing plate to an opening of the sleeve and installing an extension pipe for making the flow hole for the cooling medium of the hollow element wire communicate with an outside of the sleeve to define a space by the sleeve and the closing plate; a filling step of filling a brazing material in the space; and an end fitting mounting step of mounting an end fitting to the sleeve.

Hereinafter, a stator winding, generator, and a connection method of stator winding conductor of the present invention will be described with reference to the accompanying drawings. The same reference numerals are given to the same or similar parts, and repeated description will be omitted.

First Embodiment

FIG. 1 is a sectional longitudinal view illustrating the configuration of a generator system including a generator according to a first embodiment. A generator system 250 includes a generator 200 and a cooling system 150.

The generator 200 has a rotor 10, a stator 20, bearings 30, a frame 40 and a cooler 50.

The rotor 10 has a rotor shaft 11 extending in the direction of rotation axis, a cylindrical rotor core 12 attached to radially outside of the rotor shaft 11, and rotor windings 14 penetrating the rotor core 12.

A coupling part 11a for coupling to an engine is disposed at one axial end of the rotor shaft 11. Hereinafter, the side where the coupling part 11a is disposed is referred to as a coupling side and its opposite side as an anti-coupling side. The rotor shaft 11 is rotatably supported by the bearings 30 at both axial ends of the rotor core 12. Further, internal fans 16 are mounted to the rotor shaft 11 at portions between the rotor core 12 and bearings 30.

As illustrated in FIG. 1, the rotor core 12 may be integrally formed with the rotor shaft 11. In this case, a part of the rotor shaft 11 having a radially increased diameter is defined as the rotor core 12. A plurality of groove-like rotor slots 13 are formed in the radially outer surface of the rotor core 12 so as to be spaced peripherally from one another and to axially extend. The rotor windings 14 are generally field windings and penetrate the rotor slots 13.

The stator 20 has a stator core 21 and stator windings 100.

The stator core 21 has a hollow cylindrical shape and is disposed radially outside the rotor core 12 via a gap 18. The stator core 21 has a plurality of axially laminated electromagnetic steel plates. The stator core 21 has stator ducts 21a formed therein so as to be spaced axially from one another. The stator ducts 21a each serve as a flow channel extending radially outward of the stator core 21 from the gap 18.

A plurality of groove-like stator slots 22 are formed at radially inside of the stator core 21 so as to be spaced peripherally from one another and to axially extend. The stator windings 100 axially penetrate the stator slots 22.

Each of the stator windings 100 has a plurality of stator bars 110, a connection structure 120 attached to each stator bar 110, and a coupling conductor 130 connecting two connection structures 120.

Each stator bar 110 axially penetrates one of the plurality of the stator slots 22, and each of axial sides thereof protrudes outside each of the axial ends of the stator core 21. Both ends of each stator bar 110 are each connected to the connection structure 120. As described later, hollow element wires 112 (FIG. 2) constituting the stator bar and the connection structure 120 are formed so as to allow a cooling medium such as cooling water to pass thereinside.

The coupling conductor 130 electrically couples two connection structures 120 and is connected to a cooling part 140. The cooling part 140 is connected to the cooling system 150 through a flange 143a to allow the cooling medium passing through the connection structure 120 and coupling conductor 130 to circulate between the stator 20 and the cooling system 150.

As illustrated in FIG. 1, the frame 40 is disposed so as to surround radial outside of the stator 20. Both axial ends of the frame 40 are open, and bearing brackets 45 are fitted thereto. The bearing brackets 45 each stationarily support the bearing 30.

The cooler 50 is mounted to the frame 40. The cooler 50 has cooling pipes 51 in each of which an external cooling medium flows and a cooler cover 52 that accommodates therein the cooling pipes 51. A space inside the frame 40 and a space inside the cooler cover 52 constitute a closed space 40a and communicate with each other through a cooler inlet opening 41 and two cooler outlet openings 42. Cooling gas such as air or gas having a good cooling effect is encapsulated in the closed space 40a and is circulated inside the closed space 40a by the internal fans 16.

The cooling system 150 has a pipe 155 connected to the cooling part 140 of the stator windings 100 at each of the two connection parts 143a outside the generator 200, a pump 156 interposed in the pipe 155 and configured to drive the cooling medium, and a heat exchanger 157 for cooling the cooling medium.

The cooling medium is driven by the pump 156 and circulated in the pipe 155 and stator windings 100 to cool the stator windings 100.

Figure 2:
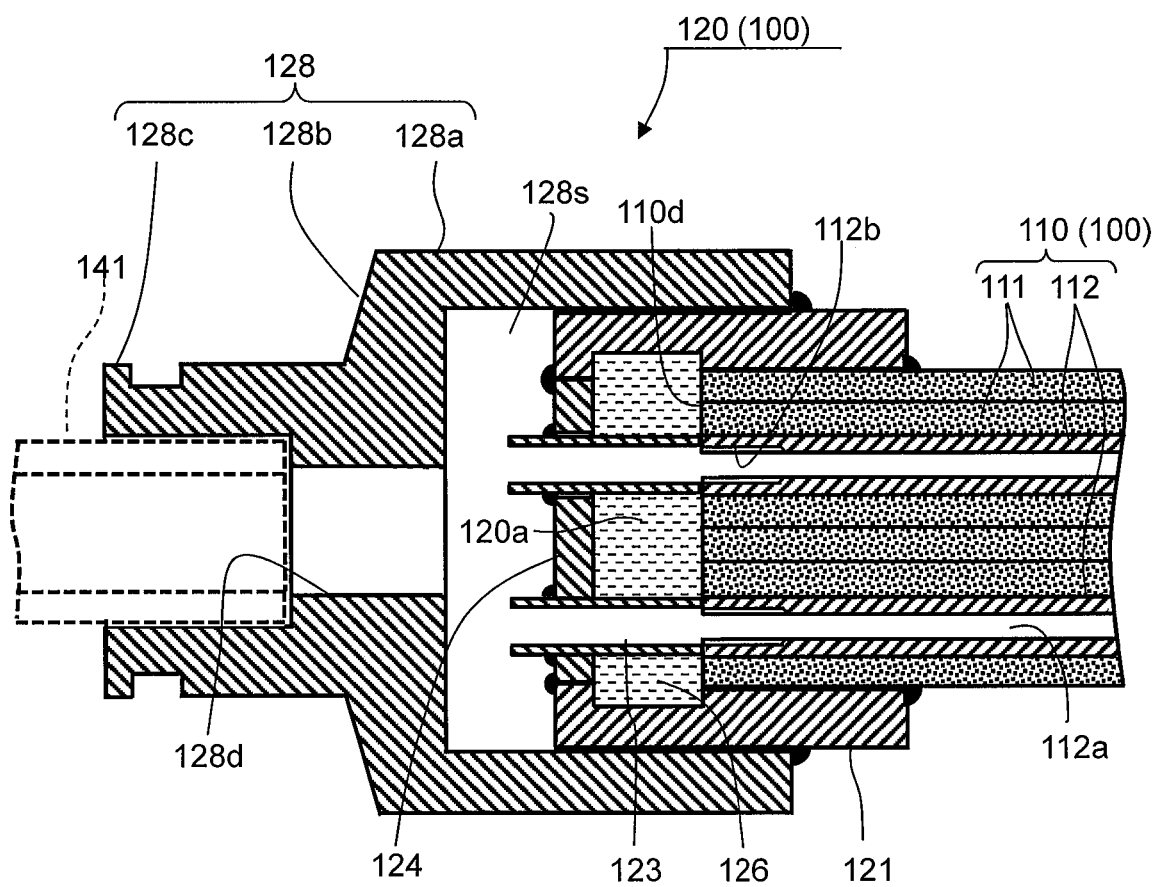
FIG. 2 is a sectional longitudinal view illustrating the configuration of the connection structure of the stator winding in the generator according to the first embodiment.

FIG. 2 is a sectional longitudinal view illustrating the configuration of the connection structure of the stator winding in the generator according to the first embodiment.

In each of the stator windings 100, the stator bar 110 to be connected to the connection structure 120 has at least one solid element wire 111 and at least one hollow element wire 112 inside of which a flow hole 112a for the cooling medium such as cooling water is formed in the longitudinal direction thereof. The solid element wire 111 and the hollow element wire 112 are made of metal or an alloy having the same main component. Preferably, for example, the metal or alloy is copper or a copper alloy.

Figure 3:
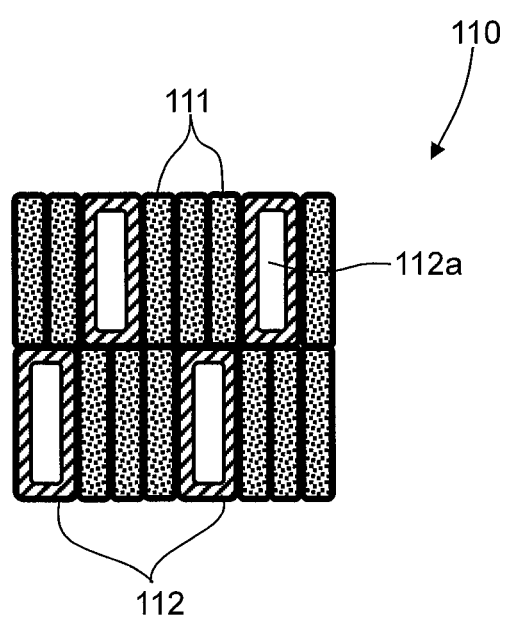
FIG. 3 is a cross-sectional view illustrating the configuration of the stator bar of the stator winding in the generator according to the first embodiment.

FIG. 3 is a cross-sectional view illustrating the configuration of the stator bar of the stator winding in the generator according to the first embodiment. The solid element wire 111 and the hollow element wire 112 each have a rectangular cross section with rounded four corners. The hollow element wire 112 has formed therein the flow hole 112a whose cross section is substantially rectangular. The solid element wire 111, the hollow element wire 112 and the flow hole 112a of the hollow element wire 112 may each have a cross section of other shapes such as a square.

As illustrated in FIG. 3, the solid element wire 111 and hollow element wire 112 are arranged such that the outer shape of the stator bar 110 is rectangular in cross section. Further, the end faces of the stator bar 110 are planar.

As illustrated in FIG. 2, the connection structure 120 has a sleeve 121, extension pipes 123, a closing plate 124, and an end fitting (clip) 128. The sleeve 121, the extension pipes 123, the closing plate 124 and the end fitting 128 are preferably each made of metal or an alloy having the same main component as the solid element wire 111 and hollow element wire 112.

As illustrated in FIG. 2, the sleeve 121 is provided so as to surround the side surface of the stator bar 110 in the vicinity of an end 110d with axially one end thereof fitted in the vicinity of the end of the stator bar 110. A space 120a is formed by being surrounded by the end 110d of the stator bar 110 and the sleeve 121; however, one surface thereof is open.

Figure 4:
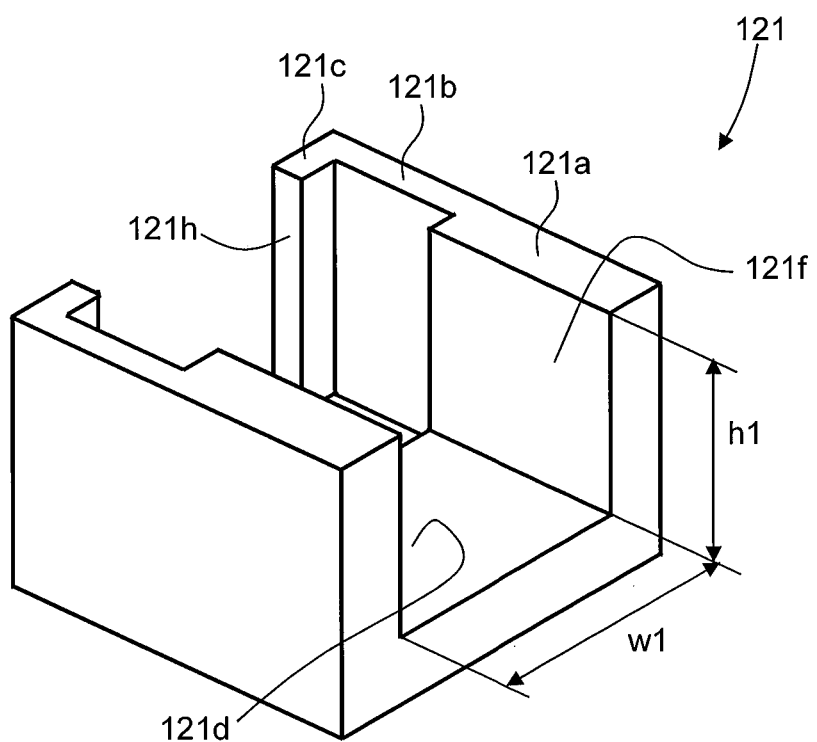
FIG. 4 is a perspective view illustrating the shape and the like of the sleeve in the connection structure of the stator winding in the generator according to the first embodiment.

FIG. 4 is a perspective view illustrating the shape and the like of the sleeve in the connection structure of the stator winding in the generator according to the first embodiment. The side surfaces of the sleeve 121 each have a thick part 121a, a thin part 121b having a smaller thickness than the thick part 121a, and an end 121c bent inward. The thick part 121a and thin part 121b are connected to each other such that there is no step between the outer surfaces thereof and there is formed a step between the inner surfaces thereof. Similarly, a bottom part 121d has a step on the inner surface side.

A width w1 and a height h1 of an inlet opening 121f formed by the thick parts 121a of the two side surfaces and bottom part 121d correspond, respectively, to the width and height of the cross section of the stator bar 110 illustrated in FIG. 3 and are set such that the stator bar 110 is fitted into the inlet opening 121f and that a gap between the stator bar 110 and the inlet opening 121f is minimized. The sleeve 121 and the side of the stator bar 110 are sealed to each other by a heat-resistant adhesive. An outlet opening 121h is formed at an end 121c on the side opposite to the inlet opening 121f.

As illustrated in FIG. 2, the closing plate 124 is provided so as to close the outlet opening 121h (FIG. 4) of the sleeve 121. The sleeve 121 and closing plate 124 are bonded to each other and sealed by a heat-resistant adhesive. The closing plate 124 is disposed on the other end side of the sleeve 121 on the side opposite to the one end thereof fitted to the vicinity of the end of the stator bar 110. The sleeve 121 and closing plate 124 defines the space 120a at the end of the stator bar 110.

Each of the extension pipes 123 is provided such that one end thereof contacts the end face of the stator bar 110. The other end of the extension pipe 123 penetrates the closing plate 124 and protrudes outside the closing plate 124. The extension pipe 123 and closing plate 124 are bonded and sealed to each other by a heat-resistant adhesive. The closing plate 124 has formed therein extension pipe through holes 124h (FIG. 12) that the extension pipes 123 penetrate.

Figure 12:
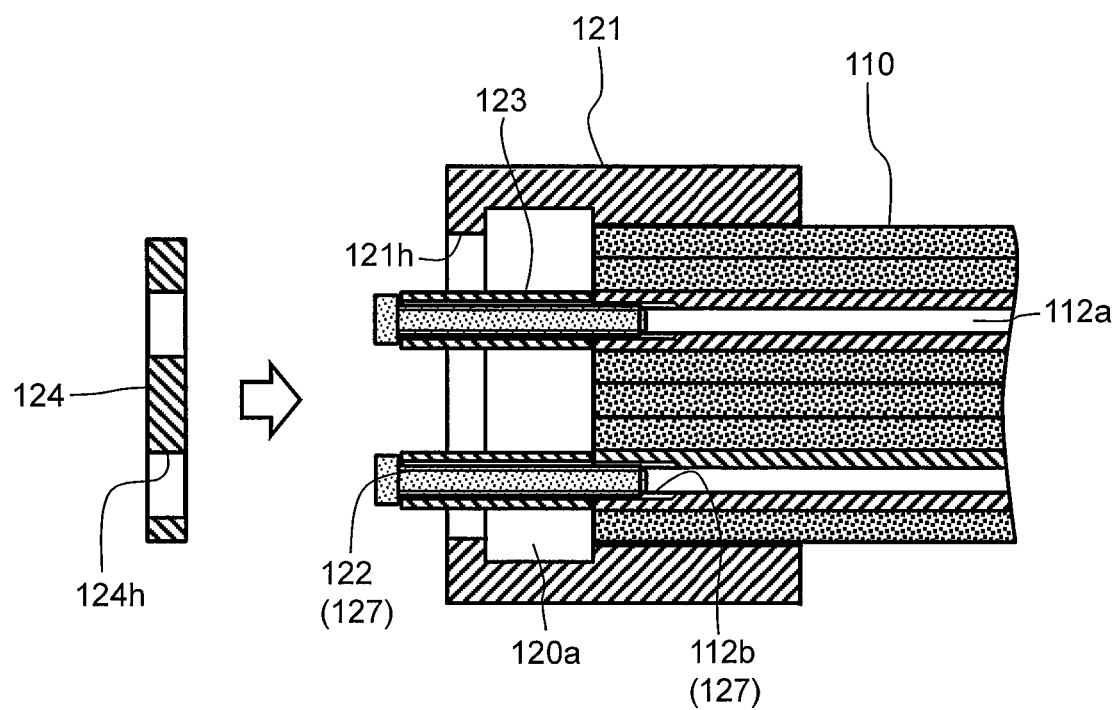
FIG. 12 is a sectional longitudinal view illustrating a fixing stage of the extension pipe using the bolt.

A female screw 112b is formed in the inner surface in the vicinity of the end of the hollow element wire 112. The female screw 112b is formed so as to be engageable with a bolt 122 (FIG. 12) to be described later. The inner diameter of the extension pipe 123 is formed larger than the outer diameter of the bolt 122. The bolt 122 and female screw 112b constitute a fastening part 127 (FIG. 12).

As described above, the tub-shaped space 120a is defined by the end 110d (FIG. 2) of the stator bar 110, the sleeve 121 and the closing plate 124. The space 120a is at least partially filled with a brazing material 126. Preferably, for example, the brazing material 126 may include copper as the main component thereof.

The flow hole 112a of the hollow element wire 112 communicates with the inside of the extension pipe 123. That is, the extension pipe 123 is disposed inside the space 120a define at the end of the stator bar 110 by the sleeve 121 and the closing plate 124, and is configured to make the flow hole 112a of the hollow element wire 112 at the end of the stator bar 110 and the outside of the space 120a communicate with each other.

As illustrated in FIG. 2, the end fitting 128 is provided outside the sleeve 121. The sleeve 121 and the end fitting 128 are brazed to each other. For example, for the brazing between the sleeve 121 and the end fitting 128, the same brazing material as the brazing material 126 filled in the space 120a can be used.

The end fitting 128 has a cylinder part 128a, a reduced part 128b, and a connection part 128c. The cylinder part 128a has four side surfaces so as to surround the sleeve 121. The connection part 128c has a portion connected to a cooling pipe 141. The reduced part 128b is a portion positioned between the cylinder part 128a and the connection part 128c, where the outer diameter is continuously reduced. A through hole 128d is formed in the reduced part 128b and the connection part 128c along the axial centers thereof. An end fitting space 128s in the end fitting 128 communicates with the through hole 128d.

Accordingly, the flow hole 112a of the hollow element wire 112 communicates with the through hole 128d through the inside of the extension pipe 123 and the end fitting space 128s.

With the above configuration, the flow hole 112a formed in each of the hollow element wires 112 of the stator bar 110 communicates with the cooling pipe 141 through the inside of the extension pipe 123, the end fitting space 128s and the through hole 128d.

Although the description has been given to connection between the one end 110d of the stator bar 110 and the connection structure 120, the same applies to connection between the other end of the stator bar 110 and the connection structure 120.

Figure 5:
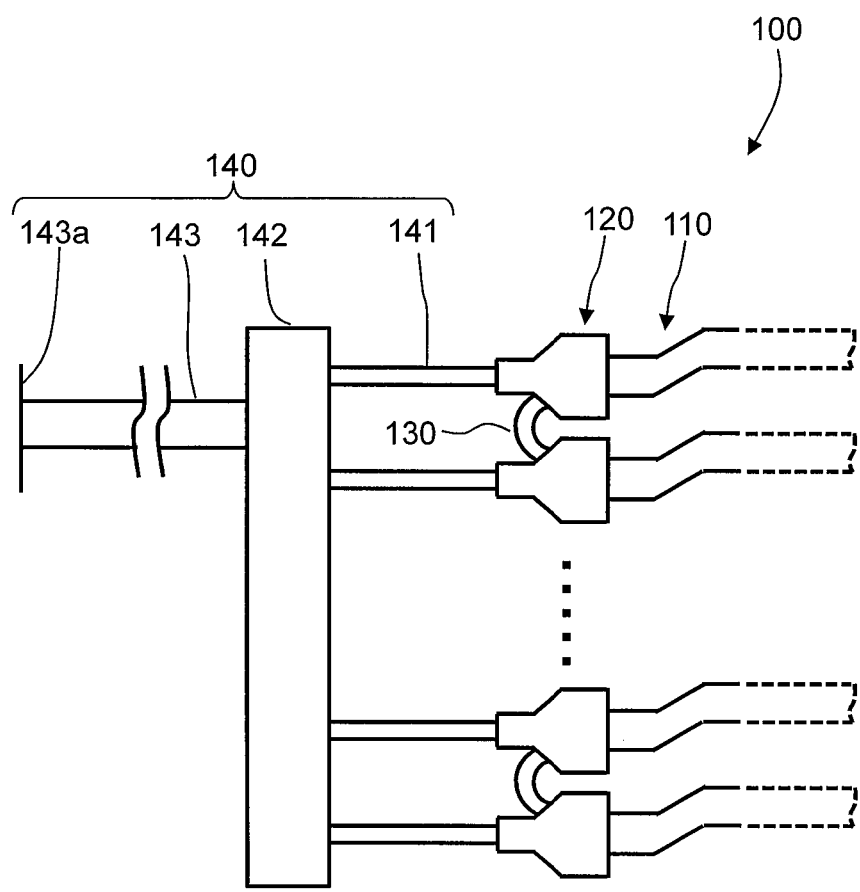
FIG. 5 is a view of diagram illustrating the configuration of the cooling part of the stator winding in the generator according to the first embodiment.

FIG. 5 is a view of diagram illustrating the configuration of the cooling part of the stator winding in the generator according to the first embodiment.

FIG. 5 illustrates electrical connection between the stator bars 110 in the stator winding 100 and connection of a coolant flow channel in the stator winding 100.

The two stator bars 110 are electrically connected by the coupling conductor 130 electrically coupling the connection structures 120 to which the two stator bars 110 are connected, to form a winding.

The flow hole 112a formed in each of the hollow element wires 112 of the stator bar 110 communicates with the cooling pipe 141 through the connection structure 120 as described above. However, although not illustrated, in order to prevent the communication of the coolant flow channel from providing electrical connection, an electrical insulator is interposed between the connection structure 120 and the cooling pipe 141 or interposed in the middle of the cooling pipe 141, for example.

Each cooling pipe 141 is connected to headers 142. The headers 142 are disposed in the closed space 40a inside the frame 40 and axially on both sides of the rotor core 12. Each header 142 is connected to a collecting pipe 143. The collecting pipe 143 penetrates the bearing bracket 45 and is connected, outside the bearing bracket 45, to the external pipe 155 (FIG. 1) at the flange 143a provided at the end thereof.

Figure 6:
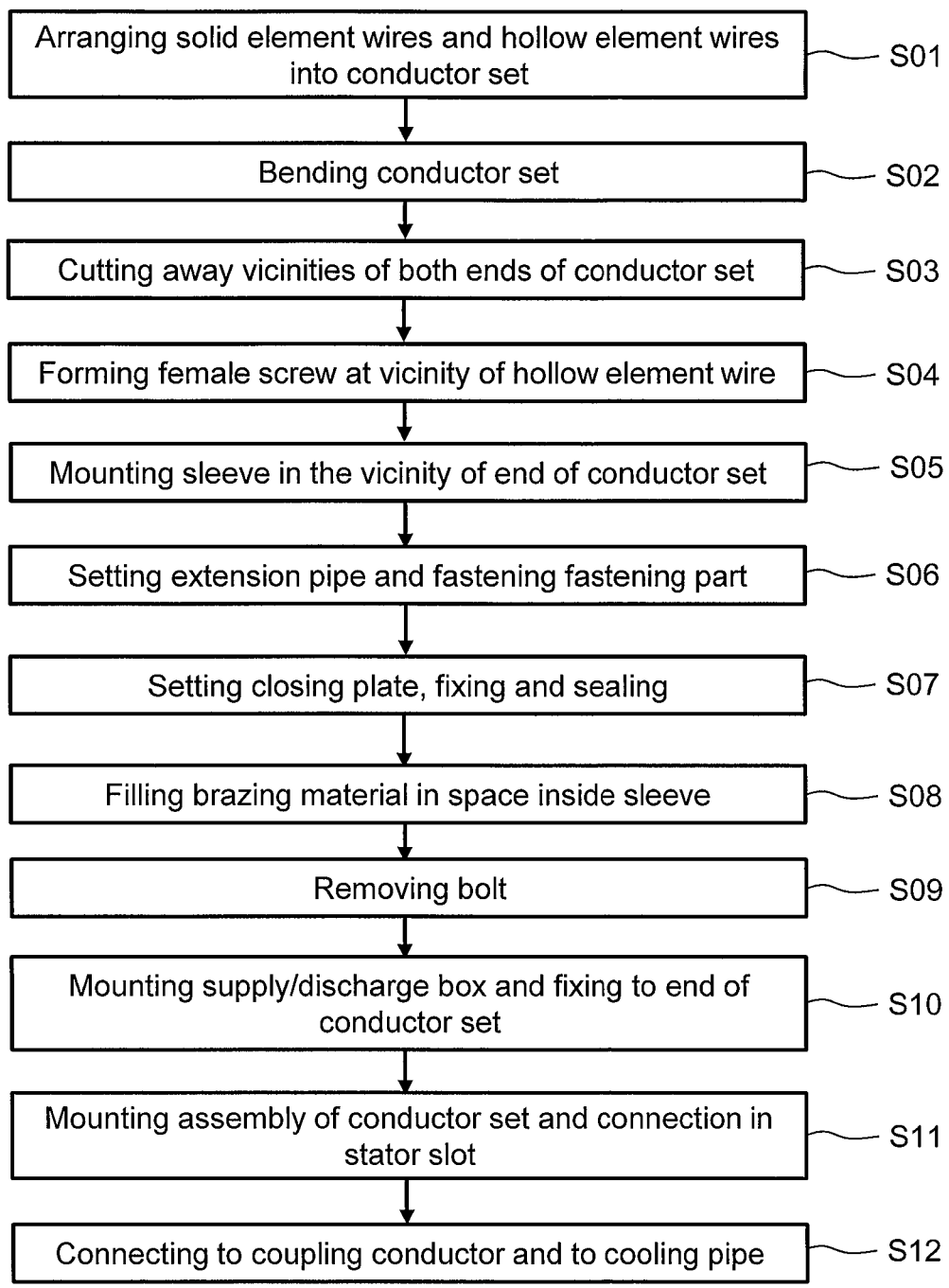
FIG. 6 is a flowchart illustrating the procedure of a connection method for the stator winding in the generator according to the first embodiment.

FIG. 6 is a flowchart illustrating the procedure of a connection method for the stator winding in the generator according to the first embodiment. Hereinafter, the procedure of the connection method for the stator winding will be described by sequentially referring to FIGS. 7 to 18.

The solid element wires 111 and the hollow element wires 112 are arranged parallel to each other to constitute the stator bar 110 (step S01). An example of the cross section of the obtained stator bar 110 is as illustrated in FIG. 3. As described above, the cross section has a rectangular outer shape.

Then, the stator bar 110 is subjected to bending (step S02).

Figure 7:
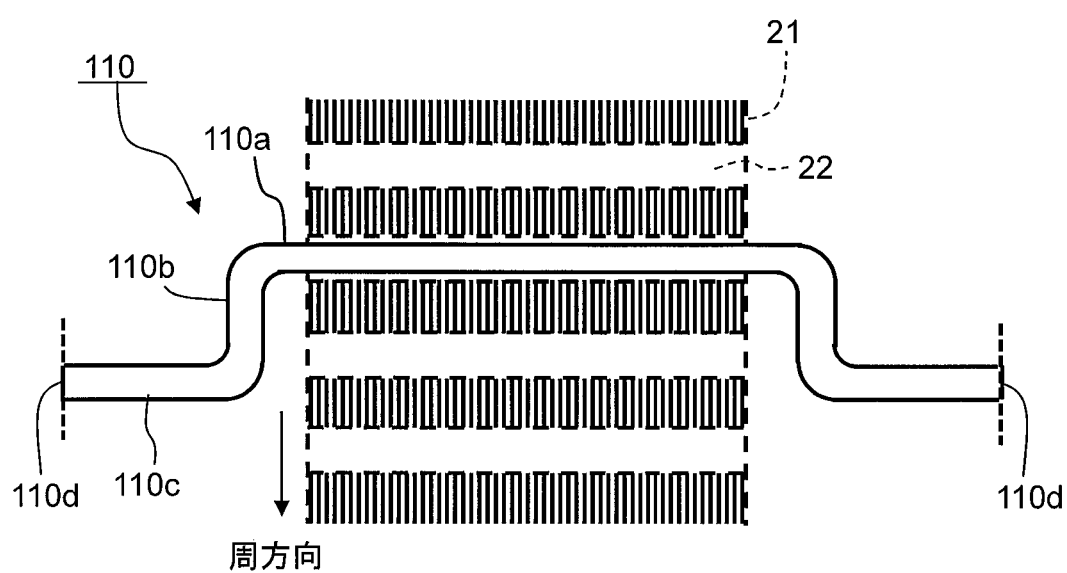
FIG. 7 is a conceptual view for explaining a bending stage of the stator bar in the procedure of the connection method for the stator winding in the generator according to the first embodiment.

FIG. 7 is a conceptual view for explaining a bending stage of the stator bar in the procedure of the connection method for the stator winding in the generator according to the first embodiment. FIG. 7 illustrates the stator bar 110 after bending process. Although the stator bar 110 is not accommodated in the stator core 21 in this stage, the stator core 21 is illustrated in a superimposed manner in order to facilitate understanding. The plurality of groove-like stator slots 22 are formed radially inside of the stator core 21 so as to be spaced peripherally from one another and to axially penetrate the stator core 21.

The stator bar 110, which has been bent, has an accommodated straight part 110a, two direction change parts 110b and two external straight parts 110c. The accommodated straight part 110a, except the vicinities of both ends thereof, is housed in the stator slot 22. The direction change parts 110b that have been bent extend outward from the accommodated straight part 110a, and are connected to the external straight parts 110c axially extending from the direction change parts 110b.

Then, the vicinities of both ends of the stator bar 110, that is, the external straight parts 110c are cut away (step S03). As illustrated in FIG. 7, the cut surface is a surface vertical to the longitudinal direction of the external straight parts 110c. As a result of the cutting, new ends 110d are formed.

Then, the female screw 112b is formed at a part of the inner surface of the hollow element wire 112 so as to extend from the end of the hollow element wire 112 toward the direction change parts 110b (step S04).

Figure 8:
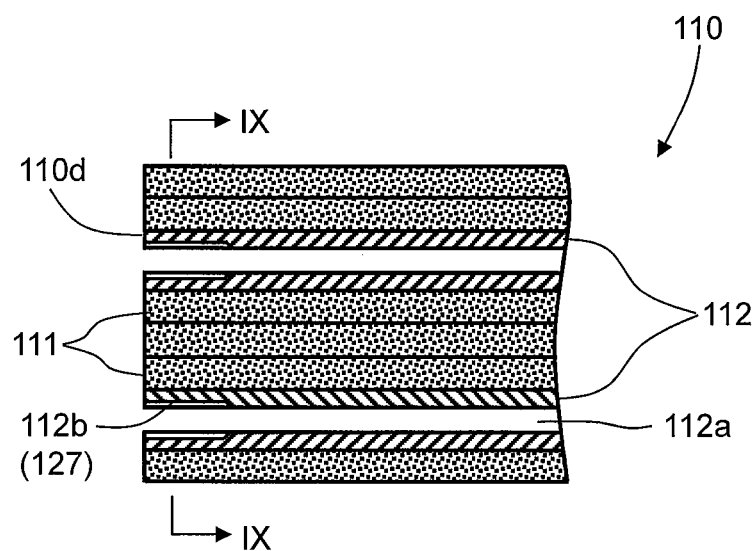
FIG. 8 is a sectional longitudinal view for explaining a female screw formation stage, taken along arrow line VIII-VIII in FIG. 9.
Figure 9:
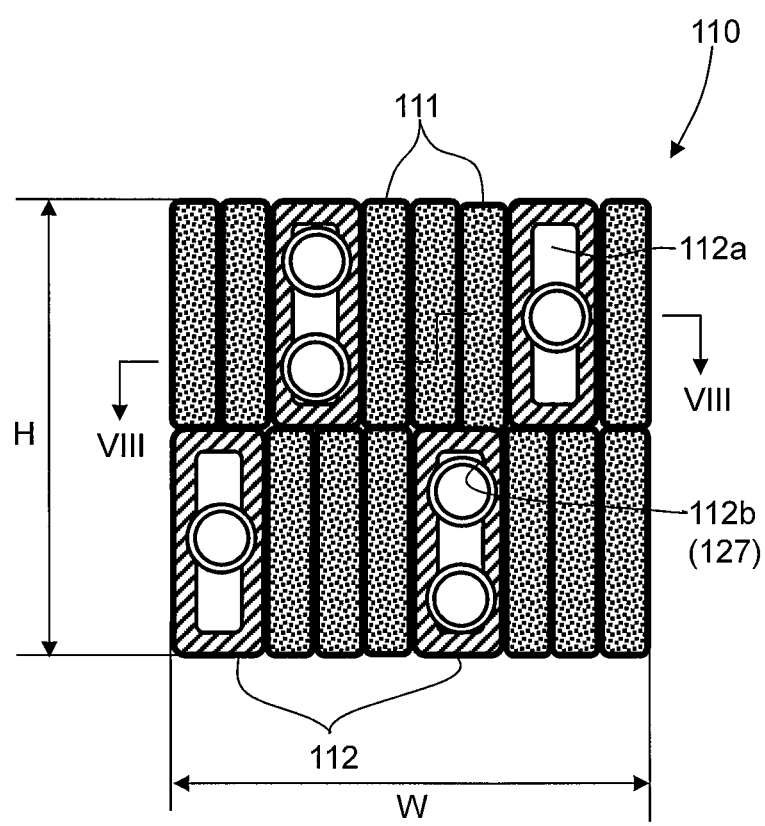
FIG. 9 is a cross-sectional view for explaining a female screw formation stage, taken along arrow line IX-IX in FIG. 8.

FIG. 8 is a sectional longitudinal view for explaining a female screw formation stage, taken along arrow line VIII-VIII in FIG. 9, and FIG. 9 is a cross-sectional view for explaining a female screw formation stage, taken along arrow line IX-IX in FIG. 8. As illustrated in FIG. 9, the female screw 112b may be formed, at one location or at two locations, in the longitudinal direction center of the cross section of the hollow element wire 112. The steps S01 to S04 are an example of a stator bar preparation step of preparing the stator bar 110 having at least one hollow element wire 112.

Then, the sleeve is mounted in the vicinity of the end of the stator bar 110 (step S05). The step S05 is an example of a mounting step of mounting the sleeve to the end of the stator bar 110.

Figure 10:
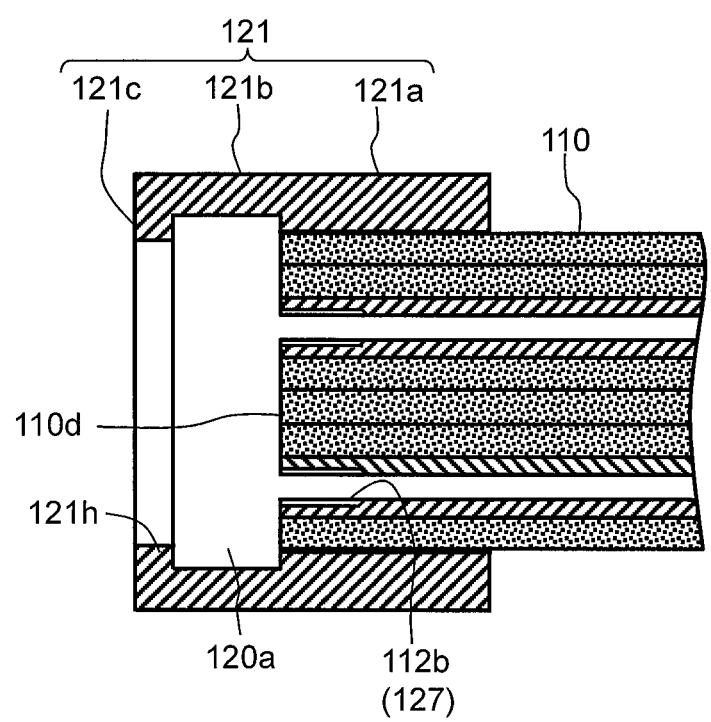
FIG. 10 is a sectional longitudinal view illustrating a stage of mounting the sleeve to the leading end of the stator bar in the procedure of the connection method for the stator winding in the generator according to the first embodiment.

FIG. 10 is a sectional longitudinal view illustrating a stage of mounting the sleeve to the leading end of the stator bar in the procedure of the connection method for the stator winding in the generator according to the first embodiment. The mounting position of the sleeve 121 is a position where the stator bar 110 overlaps the thick part 121a of the sleeve 121 in the longitudinal direction, that is, a position where the stator bar 110 is inside the thick part 121a of the sleeve 121 and does not protrude to the thin part 121b located outside the thick part 121a. More specifically, the mounting position is a position where the end 110d of the stator bar 110 is coincident with the step surface between the thick part 121a and the thin part 121b. As a result, the surface of the stator bar 110 at the end 110d is increased by the existence of the step.

Then, the extension pipe 123 is set and fastened by the fastening part 127 (step S06).

Figure 11:
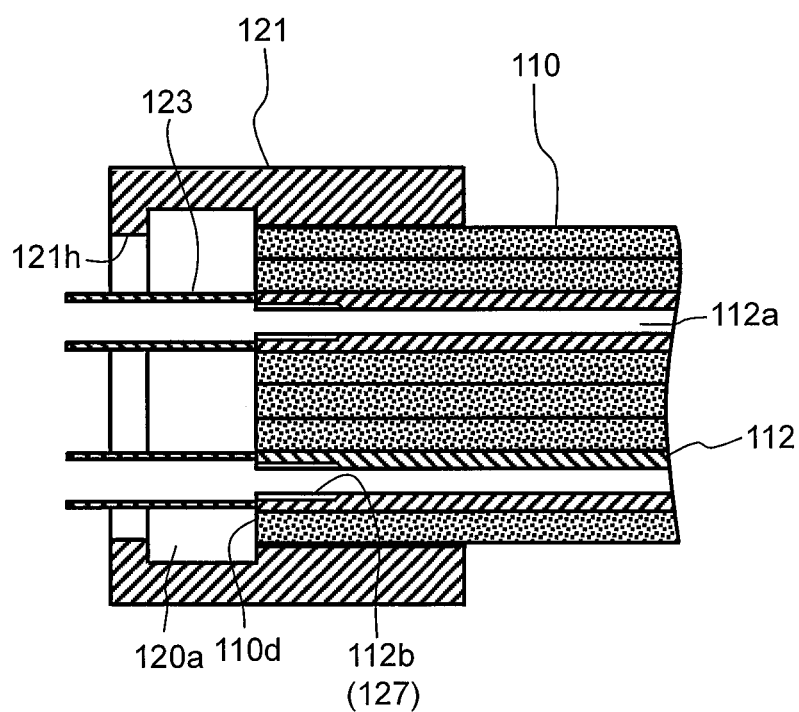
FIG. 11 is a sectional longitudinal view for explaining a setting stage of the extension pipe and closing plate in the procedure of the connection method for the stator winding, which illustrates a state in which the extension pipes are being set. One end of the extension pipe 123 is set at a position contacting an end of the hollow element wire 112 at the end 110d of the stator bar 110.

FIG. 11 is a sectional longitudinal view for explaining a setting stage of the extension pipe and closing plate in the procedure of the connection method for the stator winding, which illustrates a state in which the extension pipes are being set. One end of the extension pipe 123 is set at a position contacting an end of the hollow element wire 112 at the end 110d of the stator bar 110.

FIG. 12 is a sectional longitudinal view illustrating a fixing stage of the extension pipe using the bolt.

The bolt 122 is made to pass (penetrate) the inside of the extension pipe 123 and fastened with the male screw thereof engaged with the female screw 112b formed in the inner surface of the hollow element wire 112. For reference, in FIG. 12, the closing plate 124 to be set in the next step is illustrated. As described above, the closing plate 124 has formed therein the extension pipe through hole 124h that the extension pipe 123 penetrates. As the bolt 122, not only a solid bolt, but also a hollow bolt may be used.

Then, the closing plate 124 is set and then fixed and sealed using a heat-resistant adhesive (step S07).

Figure 13:
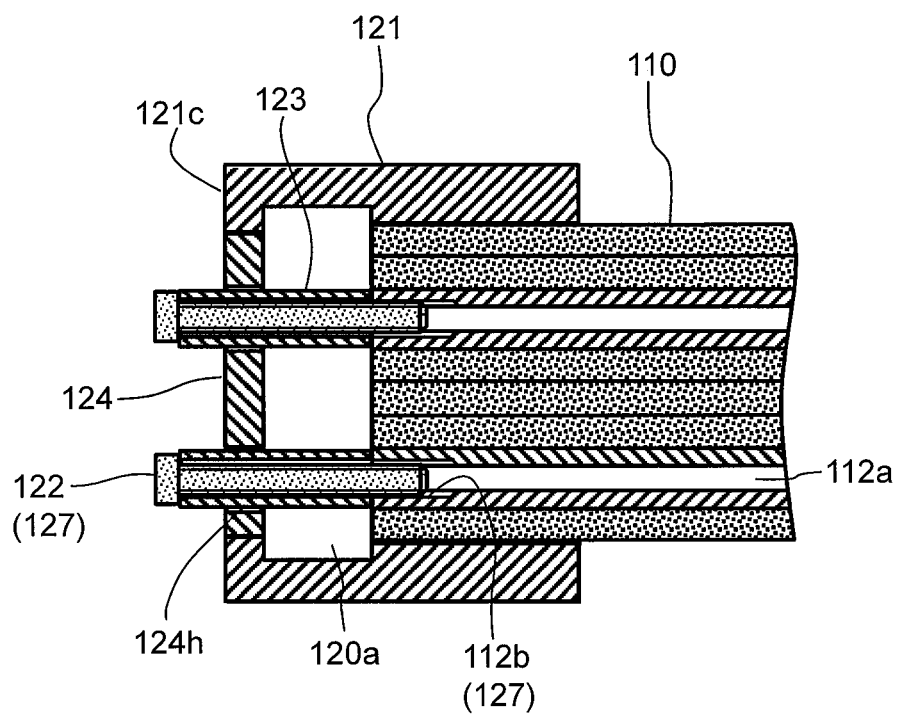
FIG. 13 is a sectional longitudinal view illustrating the setting stage of the closing plate.

FIG. 13 is a sectional longitudinal view illustrating the setting stage of the closing plate. In FIG. 13, the closing plate 124 is set at a predetermined position in a state where the extension pipe 123 is inserted into the extension pipe through hole 124h.

Figure 14:
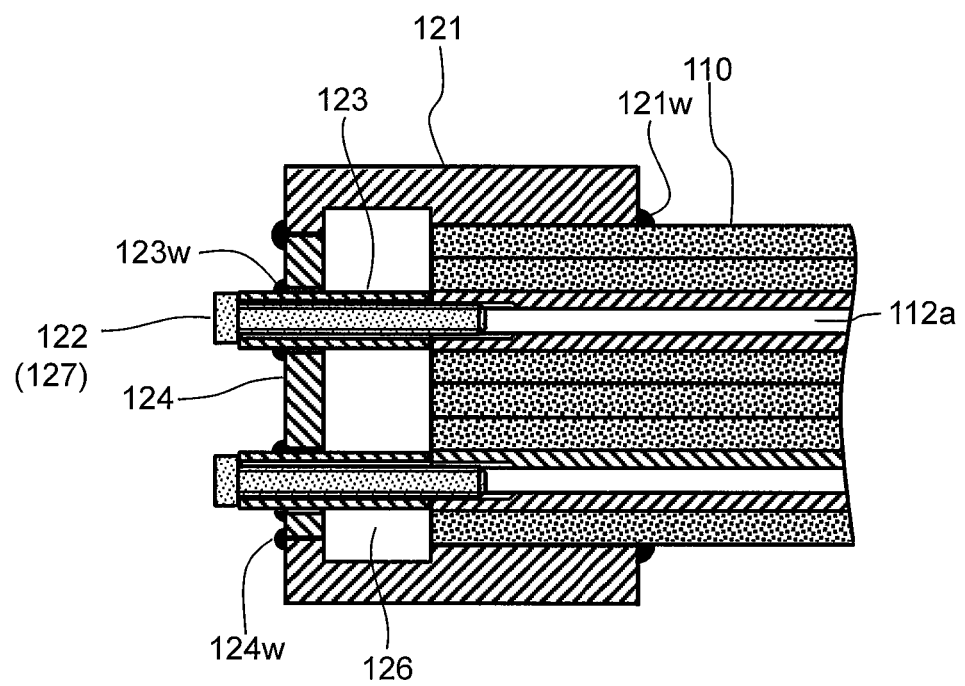

FIG. 14 is a sectional longitudinal view for explaining a fixing stage of the closing plate and the like.

In order to prevent the brazing material 126 to be filled in the space 120a in the following step from flowing in the flow hole 112a, the extension pipe 123 is formed into such a shape and dimension that cover the flow hole 112a of the hollow element wire 112. That is, the extension pipe 123 is formed into such a shape and dimension that cover the flow hole 112a so as to prevent the flow hole 112a and the space 120a from communicating with each other.

In steps S06 and S07, the bolt 122 of the fastening part 127 is made to penetrate the closing plate 124 and inside of the extension pipe 123, and a first end side of the bolt 122 is engaged with the female screw 112b formed in the hollow element wire 112. As a result, the tub-shaped space 120a is formed.

Then, fixing and sealing are performed using a sealing material. Specifically, a heat-resistant adhesive is used to apply a seal 124w between the end 121c of the sleeve 121 and the closing plate 124 and to apply a seal 123w between the closing plate 124 and the extension pipe 123. Further, a heat-resistant adhesive is used to apply a seal 121w between the stator bar 110 and the sleeve 121 from outside.

Since the brazing material 126 is filled in the space 120a in the next step S08 to seal between the flow channel of cooling water and its outside, there is no need to apply sealing between the sleeve 121 and the stator bar 110, using a brazing material or a heat-resistant adhesive.

Then, the brazing material 126 is filled in the space 120a inside the sleeve 121 (step S08).

The steps S06 to S08 are an example of a space defining step of defining the space 120a by the sleeve 121 and closing plate 124, in which, specifically, the closing plate 124 is mounted to the opening of the sleeve 121, and the extension pipe 123 that makes the flow hole 112a of the hollow element wire 112 communicate with the outside of the sleeve 121 is installed.

Figure 15:
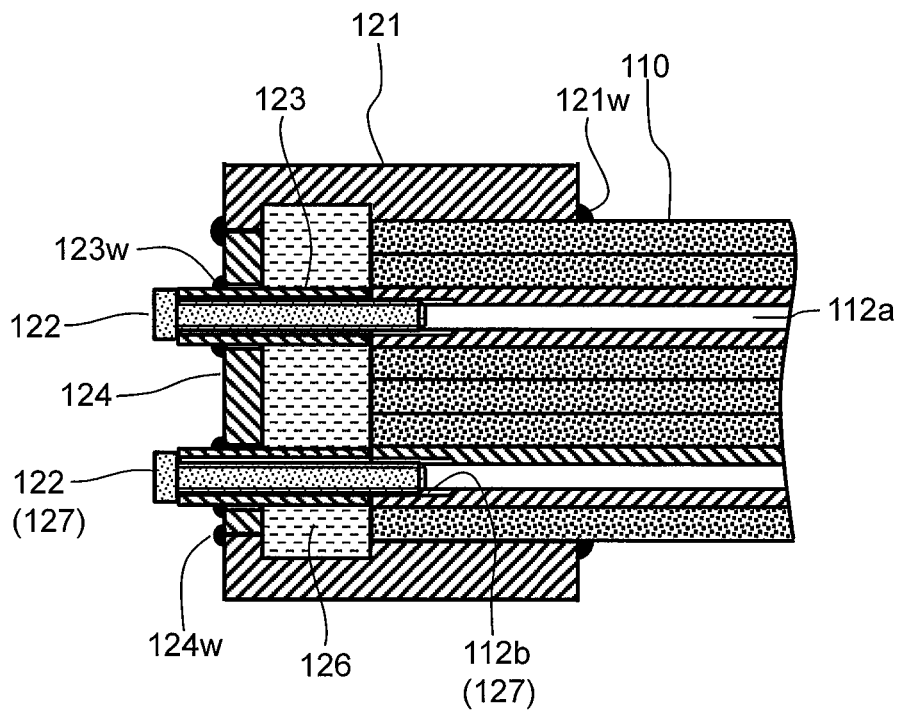
FIG. 15 is a sectional longitudinal view for explaining a brazing material filling stage (brazing material filling step) in the procedure of the connection method of the stator winding in the generator according to the first embodiment.

FIG. 15 is a sectional longitudinal view for explaining a brazing material filling stage (brazing material filling step) in the procedure of the connection method of the stator winding in the generator according to the first embodiment. The brazing material 126 can be supplied from above the tub-shaped space 120a. The brazing material 126 may be filled (supplied) only in a part of the space 120a, not in the entire space 120a.

Figure 16:
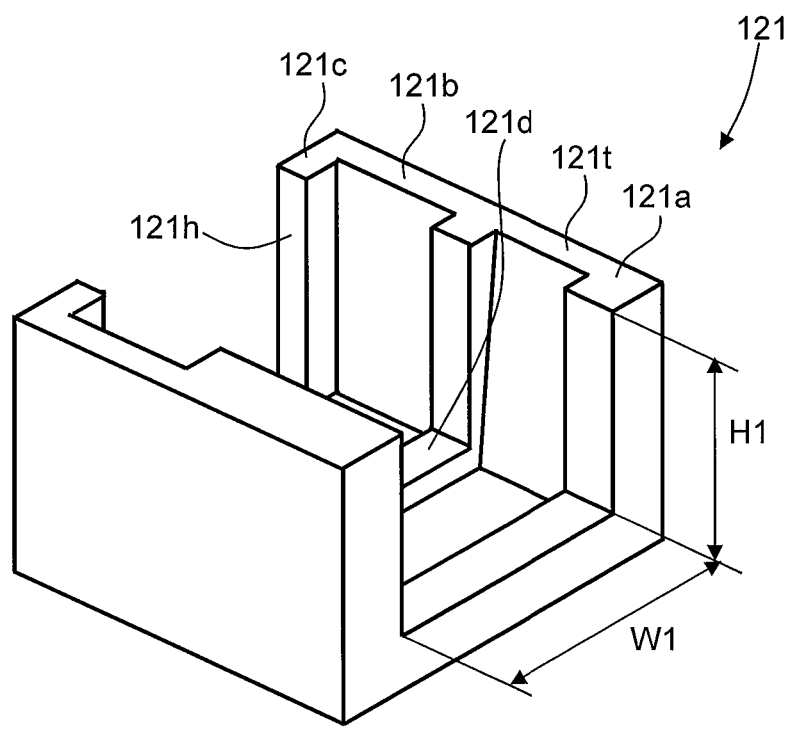
FIG. 16 is a perspective view illustrating a modification of the sleeve into which the leading end of the stator bar is inserted in the procedure of the connection method of the stator winding in the generator according to the first embodiment.

FIG. 16 is a perspective view illustrating a modification of the sleeve into which the leading end of the stator bar is inserted in the procedure of the connection method of the stator winding in the generator according to the first embodiment.

When it is difficult for the brazing material 126 to go around into the lower side of the stator bar 110 inside the sleeve 121, a tapered part 121t may be formed in the thick part 121a to ensure a path to reach the bottom part 121d as illustrated in FIG. 16.

Then, the bolt 122 is removed (step S09).

Figure 17:
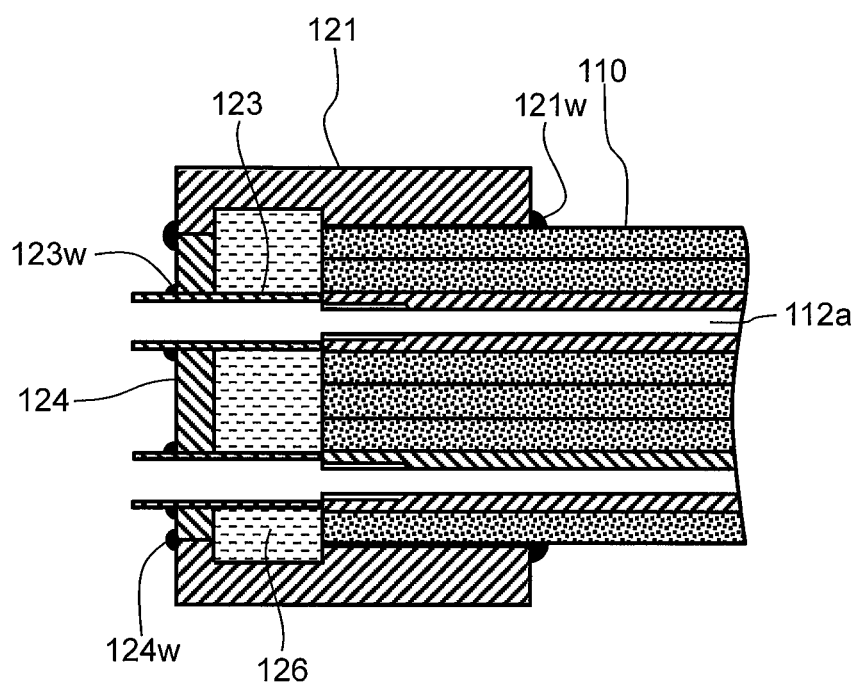
FIG. 17 is a sectional longitudinal view for explaining a stage after removal of the bolt.

FIG. 17 is a sectional longitudinal view for explaining a stage after removal of the bolt. Engagement between the bolt 122 (FIG. 15) and the female screw 112b of the hollow element wire 112 is released, and the bolt 122 is removed.

As a result of the step S09, there is formed a flow channel extending from the flow hole 112a of the hollow element wire 112 to communicate with the outside of the sleeve 121 through the extension pipe 123.

Then, the end fitting 128 is mounted and fixed to the end of the stator bar 110 that has been integrated with the sleeve 121 (step S10).

Figure 18:
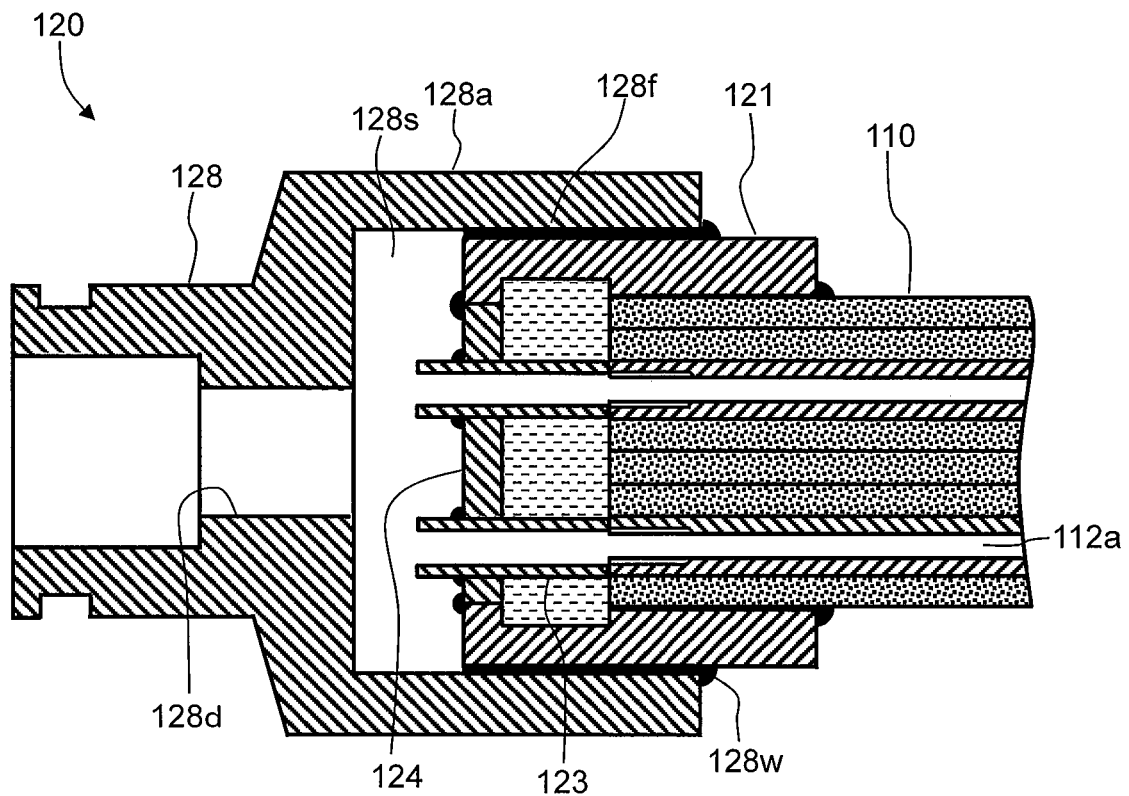
FIG. 18 is a sectional longitudinal view for explaining a connection stage to the end fitting in the procedure of the connection method of the stator winding in the generator according to the first embodiment.

FIG. 18 is a sectional longitudinal view for explaining a connection stage to the end fitting in the procedure of the connection method of the stator winding in the generator according to the first embodiment. Specifically, the end fitting 128 is mounted to the sleeve 121 so as to cover the sleeve 121 with the cylinder part 128a thereof. As a result, there is formed the end fitting space 128s surrounded by the sleeve 121, the closing plate 124 and the end fitting 128.

The end fitting space 128s serves as the flow channel of cooling water, so that it is necessary to seal between the radially outer surface of the sleeve 121 and the radially inner surface of the end fitting 128. Therefore, for example, a brazing plate is interposed between the sleeve 121 and the end fitting 128 and heated to form a brazing material 128f. Subsequently, a heat-resistant adhesive is used to form a seal 128w between the sleeve 121 and the end fitting 128 to thereby fix and seal each other. The brazing plate is preferably made of a copper-based material similar to that of the brazing material 126, but not limited thereto.

Then, the assembly of the stator bar 110 obtained thus far and the connection structure 120 is mounted in the stator slot 22 (step S11).

Then, connection to the coupling conductor 130 and then to cooling pipe 141 is performed (step S12).

As described above, in the stator winding 100 of the generator 200 according to the present embodiment, the brazing material 126 is filled in the space 120a inside the sleeve 121 of the connection structure 120, so that it is possible to ensure reliability in joining between the stator bar 110 of the stator winding 100 and the end fitting 128. That is, it is possible to eliminate factors causing degradation of the joining part due to crevice corrosion or corrosion of the brazing part due to the existence of voids.

Further, the filling of the brazing material 126 into the space 120a can be carried out in a state where the long stator bar 110 is set horizontally, eliminating the need for any special operation such as erecting the long stator bar 110 in the vertical direction.

As described above, according to the present embodiment, it is possible to ensure reliability in joining between the stator bar of the stator winding and the end fitting.

Second Embodiment

A second embodiment of the present invention is applied to the case of repairing the connection structure 120 of the stator winding 100 that has already been put into service.

Figure 19:
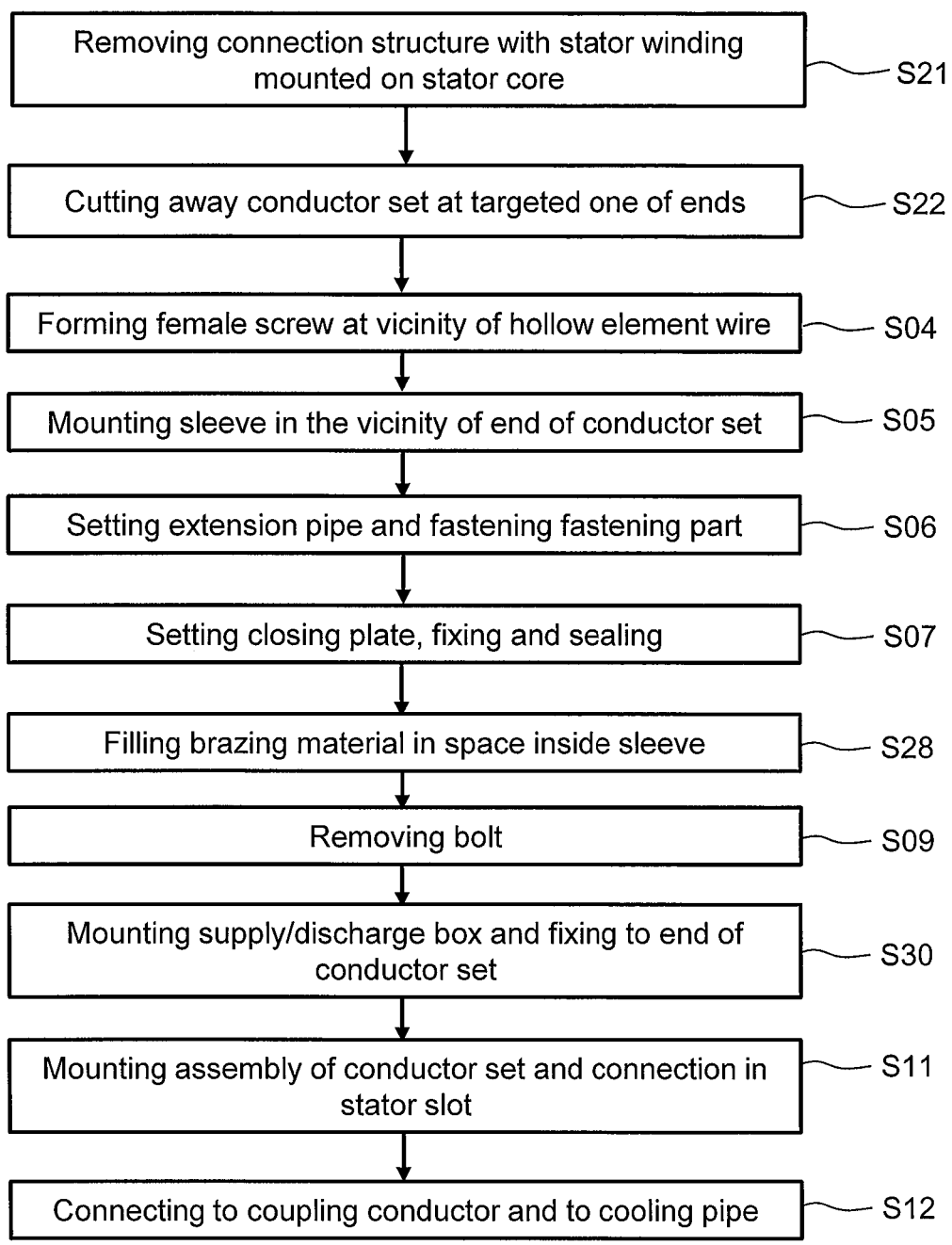
FIG. 19 is a flowchart illustrating the procedure of the connection method of the stator winding in the generator according to the second embodiment.

FIG. 19 is a flowchart illustrating the procedure of the connection method of the stator winding in the generator according to the second embodiment. The same step numbers are used to denote steps which are identical to those explained in the flowchart of the first embodiment illustrated in FIG. 6.

Hereinafter, only different points from the first embodiment will be described.

The connection structure 120 is removed with the stator winding 100 mounted on the stator core 21 (step S21). Then, the stator bar 110 is cut away at a targeted one of the ends 110d (step S22). When the connection structure 120 is also separated by the cutting of the stator bar 110 in step S22, the above step S21 is unnecessary.

Thereafter, the female screw 112b is formed in the vicinity of the end of the hollow element wire 112 (step S04), and then the sleeve 121 is mounted in the vicinity of the end 110d of the stator bar 110 (step S05).

Figure 20:
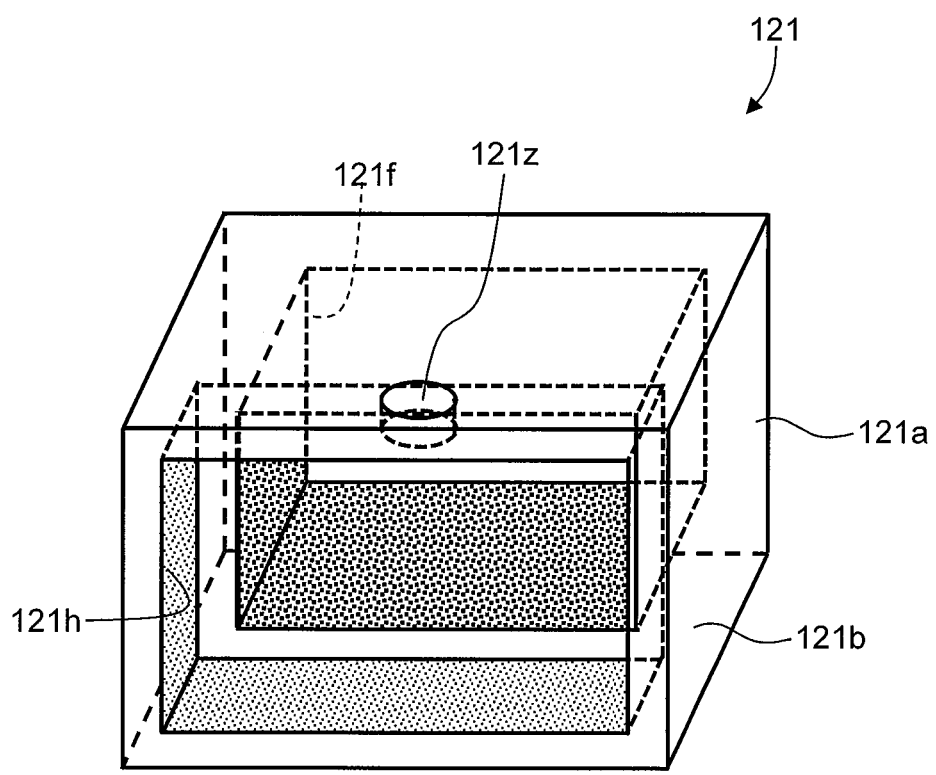
FIG. 20 is a perspective view illustrating the shape and the like of the sleeve in the connection structure of the stator winding in the generator according to the second embodiment.

FIG. 20 is a perspective view illustrating the shape and the like of the sleeve in the connection structure of the stator winding in the generator according to the second embodiment.

The sleeve 121 in the present embodiment is formed so as to surround all the four side surfaces of the stator bar 110 in the vicinity of the end thereof. Further, an inlet port 121z is formed in the thin part 121b of one side surface. The connection structure 120 may be inclined according to the inclination of its corresponding stator bar 110. The inlet port 121z is formed at a topmost position of its corresponding stator bar 110 according to the installation state in the vicinity of the end of the stator bar 110. The inlet port 121z is formed at a portion that covers one of the four side surfaces of the stator bar 110 in the vicinity of the end thereof and makes the space 120a and the outside of the space 120a communicate with each other.

Then, the extension pipe 123 is set and fastened by the fastening part 127 (step S06), and the closing plate 124 is set and then fixed and sealed using a heat-resistant adhesive (step S07). As a result, the space 120a is not the tub-shaped space like the one in the first embodiment, but is a closed space. Thus, in the injection of the brazing material 126 in step S28, the brazing material injected through the inlet port 121z is retained in the space 120a without dropping outside, irrespective of the inclination of the targeted stator bar 110.

Then, the bolt 122 is removed (step S09), and then the end fitting 128 is mounted (step S30).

Figure 21A:
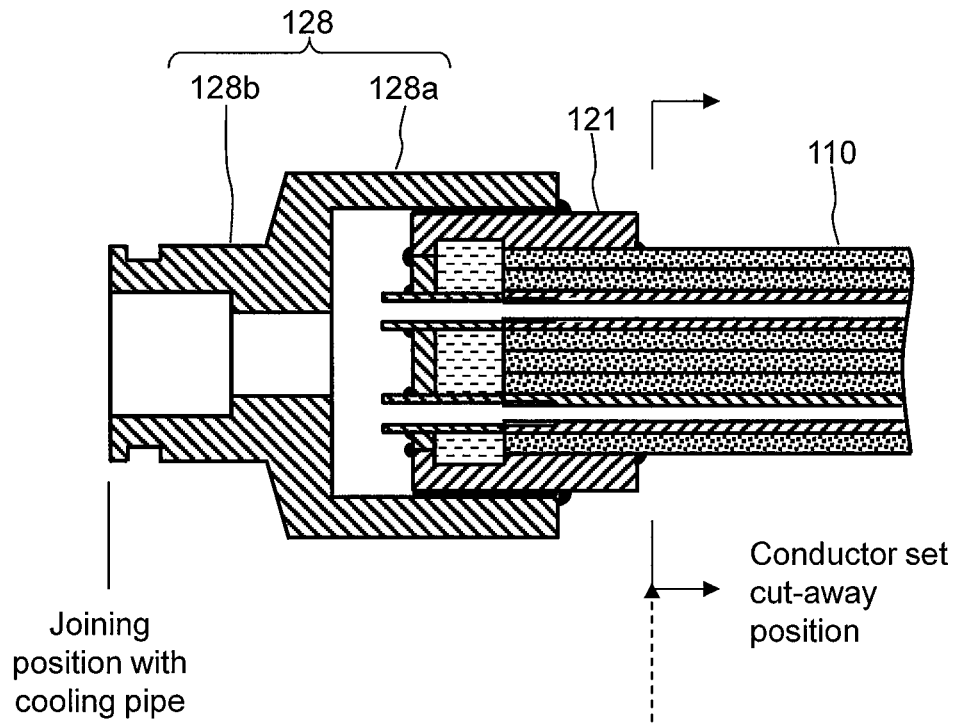
FIGS. 21A and 21B are a sectional longitudinal view for explaining a connection stage of the stator bar with the end fitting in the procedure of the connection method for the stator winding in the generator according to the second embodiment, where
Figure 21B:
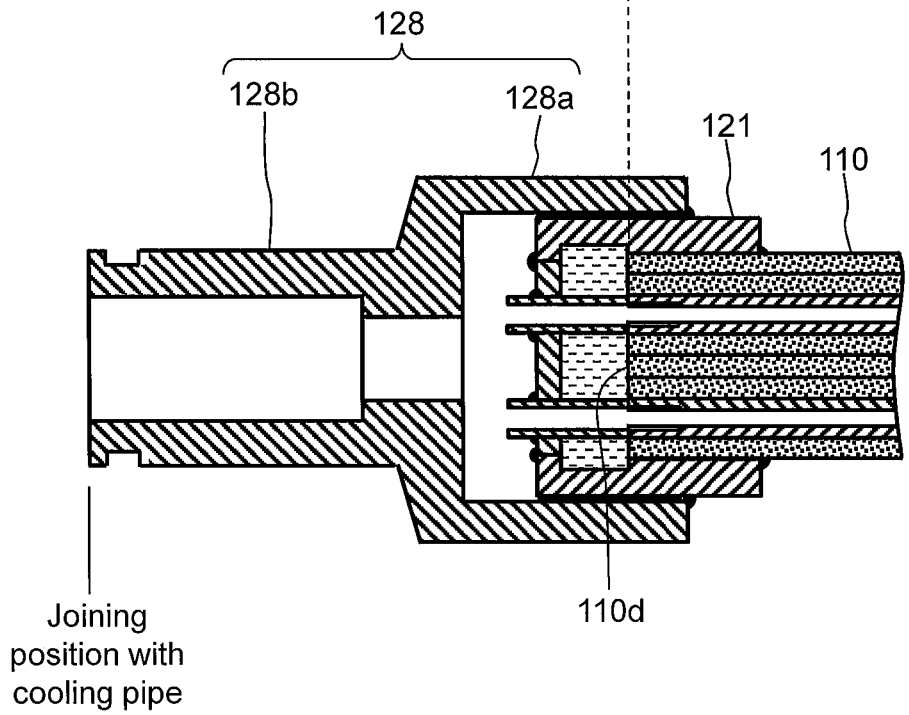

FIGS. 21A and 21B are a sectional longitudinal view for explaining a connection stage of the stator bar with the end fitting in the procedure of the connection method for the stator winding in the generator according to the second embodiment, where FIG. 21A illustrates a state before repair and FIG. 21B illustrates a state after repair.

In the second embodiment, the end fitting 128 is configured such that the reduced part 128b is longer than that of the end fitting 128 before repair. The difference in the dimension is required for joining with the cooling pipe 141 after repair.

As described above, in the second embodiment, the targeted stator bar 110 is partially treated with its installation state maintained, and a joining state with the cooling pipe 141 is maintained, whereby repair can be made with minimum effort.

Third Embodiment

Figure 22:
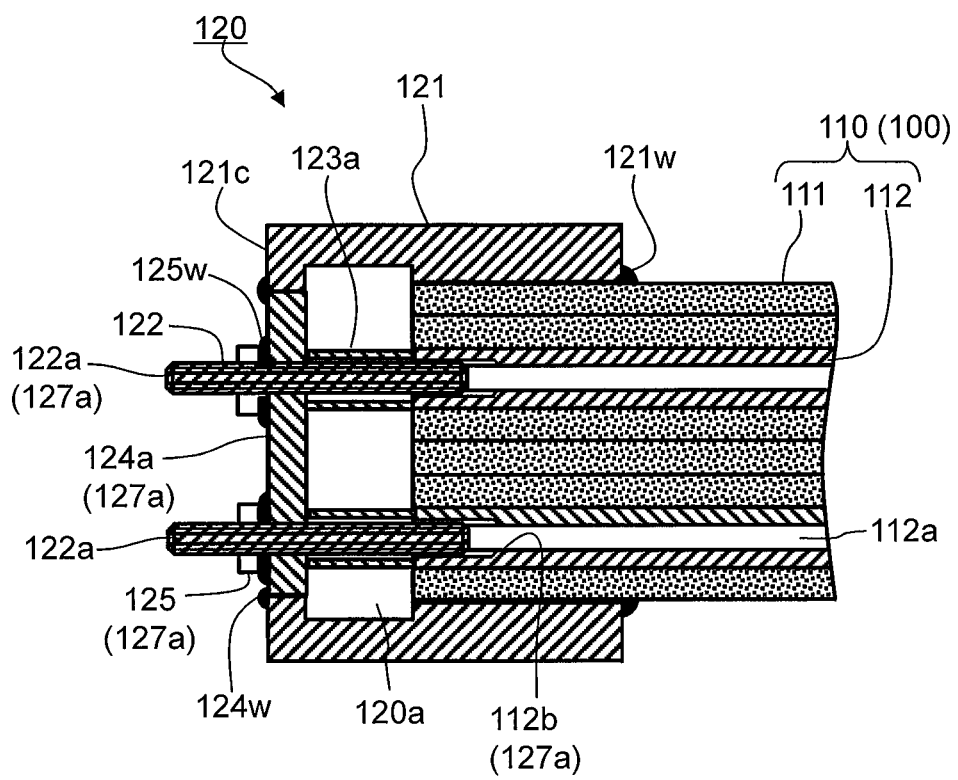
FIG. 22 is a sectional longitudinal view for explaining a setting/fixing stage of the extension pipe, the closing plate, and the like in the procedure of the connection method of the stator winding in the generator according to a third embodiment.

FIG. 22 is a sectional longitudinal view for explaining a setting/fixing stage of the extension pipe, the closing plate, and the like in the procedure of the connection method of the stator winding in the generator according to a third embodiment.

The third embodiment is a modification of the first embodiment and differs from the first embodiment in the relationship between an extension pipe 123a and a closing plate 124a and in the configuration of a fastening part 127a. Other configurations are the same as those of the first embodiment.

In the third embodiment, the extension pipe 123a does not penetrate the closing plate 124a, but both ends of the extension pipe 123a contact, respectively, an end of the hollow element wire 112 and the inner side surface, i.e., hollow element wire 112 side surface of the closing plate 124a. The closing plate 124a has formed therein, in place of the extension pipe through hole 124h, a bolt through hole (not illustrated) for penetration of a bolt 122a.

The bolt 122a, a nut 125, the closing plate 124a and the female screw 112b formed in the hollow element wire 112 constitute the fastening part 127a.

In fastening, the bolt 122a penetrates the bolt through hole formed in the closing plate 124a and the extension pipe 123a to be engaged with the female screw 112b formed in the hollow element wire 112. Then, the nut 125 is engaged with and fastened to a part of the bolt 122a that protrudes to the outside of the closing plate 124a to fasten the extension pipe 123a between the end of the hollow element wire 112 and the inner side surface of the closing plate 124a.

In this manner, the space 120a is formed. The bolt 122a is removed after the brazing material 126 is filled in the space 120a as in the first embodiment.

According to the above third embodiment, variation can be imparted to a configuration for forming the space 120a.

Other Embodiments

While the embodiments of the present invention have been described, the embodiments have been presented by way of example only, and are not intended to limit the scope of the invention. According to the embodiments, for example, generator is exemplified. However, the present invention is not limited to this. The stator winding of large size electric motors are also applicable.

Further, the features of the respective embodiments may be combined. Further, the embodiments may be conducted in other various forms, and various omissions, replacements, and modification can be done without departing from the gist of the invention. The embodiments or their variation are included in the scope or the gist of the invention and also included in the scope recited in the claims and their equivalents.

What is claimed is:

1. A stator winding axially penetrating a plurality of stator slots which are formed radially inside a stator core so as to be spaced peripherally from one another and to axially extend, comprising:
    a plurality of stator bars each penetrating one of the plurality of stator slots and having at least one hollow element wire, wherein inside the at least one hollow element wire a flow hole for a cooling medium is formed;
    a connection structure having a sleeve whose axial one end is fitted to a vicinity of an end of the stator bar, a closing plate disposed at another other end of the sleeve, and a hollow extension pipe disposed in a space defined by the sleeve and the closing plate at the end of the stator bar, and making the flow hole of the hollow element wire and an outside of the space communicate with each other; and
    a brazing material filled in the space.

2. The stator winding according to claim 1, wherein
    the sleeve covers a vicinity of ends of three side surfaces of the stator bar, and
    the space is open to one surface side of the stator bar.

3. The stator winding according to claim 1, wherein
    the sleeve covers a vicinity of ends of four side surfaces of the stator bar and has formed therein, at a part thereof that covers one of the four side surfaces, an inlet port making the space and an outside of the space communicate with each other.

4. The stator winding according to claim 1, wherein
    a female screw is formed in a vicinity of an end of the hollow element wire, and the closing plate has formed therein an extension pipe through hole, through which the extension pipe penetrates.

5. A generator comprising:
a rotor extending in a direction of rotation axis and having formed therein a rotor core at an axial center thereof; and
a stator having a hollow cylindrical stator core disposed radially outside the rotor core and a stator winding axially penetrating a plurality of stator slots which are formed radially inside the stator core so as to be spaced peripherally from one another and to axially extend, wherein
the stator winding includes:
a plurality of stator bars each penetrating one of the plurality of stator slots and having at least one hollow element wire, wherein inside the at least one hollow element wire a flow hole for a cooling medium is formed;
a connection structure having a sleeve whose axial end is fitted to a vicinity of an end of the stator bar, a closing plate disposed at another end of the sleeve, and a hollow extension pipe disposed in a space defined, at the end of the stator bar, by the sleeve and the closing plate and making the flow hole of the hollow element wire and an outside of the space communicate with each other; and
a brazing material filled in the space.

6. A connection method for a stator winding conductor, comprising:
preparing a stator bar having at least one hollow element wire, wherein inside the at least one hollow element wire a flow hole for a cooling medium is formed;
mounting a sleeve to an end of the stator bar;
mounting a closing plate to an opening of the sleeve and installing an extension pipe for making the flow hole for the cooling medium of the at least one hollow element wire communicate with an outside of the sleeve to define a space by the sleeve and the closing plate;
filling a brazing material in the space; and
mounting an end fitting to the sleeve.

7. The connection method according to claim 6, wherein the stator bar preparation includes cutting an end of the stator bar connected to a connection structure to be replaced.

8. The connection method according to claim 6, further comprising:
engaging a bolt with a female screw formed in a vicinity of the hollow element wire, the bolt penetrating the extension pipe; and
releasing the bolt from the female screw;
wherein the engaging is performed before the filling and the releasing is performed after the filling.

* * * * *